Patented Aug. 28, 1934

1,971,660

UNITED STATES PATENT OFFICE

1,971,660

THERMOPHORIC COMPOSITION

Ernst Sander, Berlin-Charlottenburg, Germany

No Drawing. Application October 29, 1930, Serial No. 492,097. In Germany November 2, 1929

4 Claims. (Cl. 44—3)

My invention refers to thermophoric compositions, i. e. to masses in which heat energy can be accumulated for heating and other purposes.

It is an object of my invention to provide a new mass or composition of this character which is more efficient than similar masses hitherto used.

In heat storers or accumulators thermophoric masses have been used consisting of resins, oils, salts or metals, which when put to use are molten by conveying heat energy, this convection being continued beyond the melting of the mass and considerable amounts of heat energy being accumulated in the molten mass, which on solidifying again gives off the accumulated heat at a rate corresponding to the amount and character of the insulation surrounding the mass.

The thermophoric masses hitherto suggested have only been put to a limited use, partly because the temperatures of heat storage were too low and partly because the masses develop gases, pressure and tension, which are undesirable. Moreover if the accumulation of heat was performed repeatedly, the masses underwent changes which rendered them soon useless.

I have now found that certain mixtures of salts are particularly adapted for use in the accumulation of heat energy. More especially mixtures of metal chlorides have been found to be particularly useful. Such mixtures, boiling at a comparatively low temperature, when heated, form complex salts which, when molten, neither decompose nor dissociate, but get more and more fluid, thus allowing circulation in closed pipe systems, since the temperatures of dissociation or decomposition of such mixtures or complex salts are far higher than those of the constituents.

Thus for instance a mixture of aluminium chloride, sodium chloride and ferric chloride in the proportion of 6 aluminium chloride to 3 sodium chloride to not more than 1 ferric chloride starts softening at 60° C. and if heated far beyond its melting point, remains liquid up to the maximum temperature which may exceed the boiling temperature of its constituents, while solidifying again after having given off all the heat stored therein. The point at which the anhydrous mixture (147 to 150° C.) is completely molten is far lower than that of the three constituents, $Al_2Cl_6.12$ aq. melting (under 2.5 atms. pressure) at 193°, $Fe_2Cl_6$ at 301–307° C., NaCl at about 820° C. The presence of ferric chloride appears to be responsible in the first line for the lowering of the melting point, since a mixture of aluminium chloride and sodium chloride melts only at 182°. Experiments have shown that a salt mixture such as described, when heated with the aid of small sources of heat, is capable of storing heat far beyond 1000° C., without undergoing any changes at this temperature, so that it can be reused for heat storage almost infinitely. The mixture on being heated to melting temperature (147 to 150° C.) becomes as thinly fluid as water and, if kept under seclusion from air, does not evaporate so that it can be enclosed in sealed tubes or other containers and heated therein to high temperatures without any appreciable pressure being generated therein. Since at temperatures as high as 800° C. and above the fluid melt does not attack iron, it can be used for transferring, storing and equalizing the heat of fire gases designed to heat boilers, oil stills, cracking retorts etc., a great saving of heat energy being thereby attained and local overheating being effectually prevented.

In the practical use of this invention the salt mixture is heated under seclusion from air to the highest temperature required and is then enclosed in a suitable cell which may or may not be insulated.

Preferably some suitable heat conducting material, for instance graphite powder, is added to the salt mixture in order to render the emission of heat more uniform and rapid.

Various changes may be made in the details disclosed in the foregoing specification without departing from the invention or sacrificing the advantages thereof.

I claim:

1. A thermophoric mass consisting of an anhydrous mixture of aluminium chloride, sodium chloride and ferric chloride.

2. Thermophoric mass consisting of a molten mixture of aluminium chloride, ferric chloride and sodium chloride.

3. A thermophoric mass consisting of an anhydrous mixture of 6 parts aluminium chloride, 3 parts sodium chloride and not more than 1 part ferric chloride.

4. The method of preparing a heat storer, comprising heating a mixture of aluminum chloride, ferric chloride and sodium chloride under seclusion from air to the highest operating temperature.

ERNST SANDER.